US012405162B2

(12) United States Patent
Tabata et al.

(10) Patent No.: US 12,405,162 B2
(45) Date of Patent: Sep. 2, 2025

(54) SPECTROSCOPIC UNIT AND SPECTROSCOPIC MODULE

(71) Applicant: HAMAMATSU PHOTONICS K.K., Hamamatsu (JP)

(72) Inventors: Kei Tabata, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/631,941

(22) PCT Filed: Sep. 24, 2020

(86) PCT No.: PCT/JP2020/036020
§ 371 (c)(1),
(2) Date: Feb. 1, 2022

(87) PCT Pub. No.: WO2021/065668
PCT Pub. Date: Apr. 8, 2021

(65) Prior Publication Data
US 2024/0035888 A1 Feb. 1, 2024

(30) Foreign Application Priority Data
Oct. 4, 2019 (JP) .................. 2019-183873

(51) Int. Cl.
*G01J 3/26* (2006.01)
*G01J 3/02* (2006.01)
*G01J 3/12* (2006.01)

(52) U.S. Cl.
CPC .............. *G01J 3/26* (2013.01); *G01J 3/0262* (2013.01); *G01J 3/0291* (2013.01); *G01J 2003/1213* (2013.01)

(58) Field of Classification Search
CPC .......... G01J 3/26; G01J 3/0262; G01J 3/0291; G01J 2003/1213
See application file for complete search history.

(56) References Cited

U.S. PATENT DOCUMENTS 3,389,256 A    6/1968   Astheimer
9,587,978 B2 *   3/2017   Okudo .................. G01J 1/0411
(Continued)

FOREIGN PATENT DOCUMENTS

CN    103969726 A    8/2014
CN    106017670 A    10/2016
(Continued)

OTHER PUBLICATIONS

English-language translation of International Preliminary Report on Patentability (IPRP) dated Apr. 14, 2022 that issued in WO Patent Application No. PCT/JP2020/036020.
(Continued)

*Primary Examiner* — Uzma Alam
*Assistant Examiner* — Mohamed Doumbia
(74) *Attorney, Agent, or Firm* — Faegre Drinker Biddle & Reath LLP

(57) ABSTRACT

A spectroscopic unit includes a housing having a wall part formed with an opening, a first aperture part formed with a first aperture, and a second aperture part formed with a second aperture, in which a length of the second aperture in the facing direction is larger than a length of the first aperture in the facing direction, an outer edge of the first aperture is positioned inside each of an outer edge of the opening and an outer edge of the second aperture, and the first aperture includes at least one of a first tapered portion reaching a first surface of the first aperture part and extending toward the
(Continued)

first surface, and a second tapered portion reaching a second surface of the first aperture part and extending toward the second surface.

17 Claims, 10 Drawing Sheets

(56) References Cited

U.S. PATENT DOCUMENTS

| | | | |
|---|---|---|---|
| 2002/0101574 | A1 | 8/2002 | Tsuji |
| 2004/0227928 | A1 | 11/2004 | Bonne et al. |
| 2016/0182765 | A1 | 6/2016 | Hirokubo |
| 2016/0282183 | A1* | 9/2016 | Kanai ................... G01J 3/524 |
| 2018/0292267 | A1* | 10/2018 | Hirose ................. G01J 3/0213 |

FOREIGN PATENT DOCUMENTS

| | | |
|---|---|---|
| CN | 108344506 A | 7/2018 |
| CN | 112955721 A | 6/2021 |
| JP | S61-077728 A | 4/1986 |
| JP | S62-047932 U | 3/1987 |
| JP | H8-189863 A | 7/1996 |
| JP | H11-160156 A | 6/1999 |
| JP | 3063513 U | 11/1999 |
| JP | 2001-517120 A | 10/2001 |
| JP | 2002-287200 A | 10/2002 |
| JP | 2003-501113 A | 1/2003 |
| JP | 2010151639 A * | 7/2010 |
| JP | 2011-220770 A | 11/2011 |
| JP | 2013-508677 A | 3/2013 |
| JP | 2014-115244 A | 6/2014 |
| JP | 2014-132304 A | 7/2014 |
| JP | 2014-145643 A | 8/2014 |
| JP | 2015-049276 A | 3/2015 |
| JP | 2016-176910 A | 10/2016 |
| JP | 2017-122688 A | 7/2017 |
| WO | WO-98/044322 A1 | 10/1998 |
| WO | WO-99/039375 A1 | 8/1999 |
| WO | WO-00/016046 A2 | 3/2000 |
| WO | WO-2011/045722 A2 | 4/2011 |
| WO | WO-2015/107655 A1 | 7/2015 |
| WO | WO 2017/054098 A1 | 4/2017 |
| WO | WO-2017/057372 A1 | 4/2017 |
| WO | WO-2020/090181 A1 | 5/2020 |

OTHER PUBLICATIONS

Fischer. R.E. et al., "Optical System Design, Second edition", The McGraw-Hill Companies Inc., 2008, p. 703-p. 737.

* cited by examiner

SPECTROSCOPIC UNIT AND SPECTROSCOPIC MODULE

TECHNICAL FIELD

The present disclosure relates to a spectroscopic unit and a spectroscopic module.

BACKGROUND ART

A spectroscopic module including a light source emitting light for irradiating an object, a spectroscopic unit configured to disperse light reflected by the object or light transmitted through the object, and a photodetector detecting the light dispersed by the spectroscopic unit is known (see, for example, Patent Literature 1). According to such a spectroscopic module, for example, components of an object can be analyzed in a non-destructive manner.

CITATION LIST

Patent Literature

[Patent Literature 1] Japanese Unexamined Patent Publication No. 2014-145643

SUMMARY OF INVENTION

Technical Problem

In the spectroscopic module as described above, there are cases in which a Fabry-Perot interference filter is applied to the spectroscopic unit. In that case, improving the spectral accuracy by the Fabry-Perot interference filter is extremely important, for example, in improving the accuracy of analysis of components of an object.

An objective of the present disclosure is to provide a spectroscopic unit and a spectroscopic module in which the spectral accuracy by a Fabry-Perot interference filter can be improved.

Solution to Problem

A spectroscopic unit of one aspect of the present disclosure includes a Fabry-Perot interference filter having a first mirror part and a second mirror part in which a distance therebetween is variable, a housing having a wall part formed with an opening facing the Fabry-Perot interference filter in a facing direction of the first mirror part and the second mirror part, the housing accommodating the Fabry-Perot interference filter, a first aperture part provided on a side opposite to the Fabry-Perot interference filter with respect to the wall part and formed with a first aperture facing the opening in the facing direction, and a second aperture part provided on a side opposite to the wall part with respect to the first aperture part and formed with a second aperture facing the first aperture in the facing direction, in which a length of the second aperture in the facing direction is larger than a length of the first aperture in the facing direction, an outer edge of the first aperture is positioned inside each of an outer edge of the opening and an outer edge of the second aperture when viewed from the facing direction, and the first aperture includes at least one of a first tapered portion reaching a first surface of the first aperture part on the wall part side and extending toward the first surface, and a second tapered portion reaching a second surface of the first aperture part on the second aperture part side and extending toward the second surface.

In the spectroscopic unit, a length of the second aperture in the facing direction is larger than a length of the first aperture in the facing direction, and the outer edge of the first aperture is positioned inside each of an outer edge of the opening and the outer edge of the second aperture when viewed from the facing direction. Therefore, light that has passed through the second aperture, the first aperture, and the opening is incident on the Fabry-Perot interference filter in a state in which a range of the incident angle is made small. Thereby, the Fabry-Perot interference filter can be made to function appropriately. Also, in this spectroscopic unit, the outer edge of the first aperture is positioned inside the outer edge of the second aperture when viewed from the facing direction, and the first aperture includes at least one of the first tapered portion and the second tapered portion. Therefore, light incident on the second aperture at a large incident angle becoming stray light by being incident into the housing while being reflected by an inner surface of the second aperture can be suppressed. As described above, according to the spectroscopic unit, a resolution can be improved in a spectroscopic spectrum obtained by the Fabry-Perot interference filter, and the spectral accuracy by the Fabry-Perot interference filter can be improved.

In the spectroscopic unit of one aspect of the present disclosure, the first aperture may include both the first tapered portion and the second tapered portion. Alternatively, in the spectroscopic unit of one aspect of the present disclosure, the first aperture may include only the second tapered portion, and the second tapered portion may reach both the first surface and the second surface. In these cases, even when light incident on the second aperture at a large incident angle travels into the second aperture while being reflected by the inner surface of the second aperture, the light is reflected by the inner surface of the second tapered portion toward a side opposite to the inside of the housing. Therefore, according to this, the light incident on the second aperture at a large incident angle becoming stray light by being incident into the housing while being reflected by the inner surface of the second aperture can be reliably suppressed.

In the spectroscopic unit of one aspect of the present disclosure, the outer edge of the first aperture may be positioned inside an outer edge of a light transmission region of the Fabry-Perot interference filter when viewed from the facing direction. According to this, a proportion of light transmitting through the light transmission region of the Fabry-Perot interference filter in the light that has passed through the second aperture and the first aperture can be increased.

In the spectroscopic unit of one aspect of the present disclosure, the outer edge of the opening may be positioned outside the outer edge of the second aperture when viewed from the facing direction. According to this, a range of the incident angle of the light to be incident into the housing can be appropriately defined by the first aperture and the second aperture.

In the spectroscopic unit of one aspect of the present disclosure, the first aperture may be an opening formed by etching. In this case, the first aperture has a highly accurate shape as compared with a case in which the first aperture is an opening formed by, for example, machining. Therefore, according to this, the first aperture can be made to function appropriately.

In the spectroscopic unit of one aspect of the present disclosure, the first aperture part may be a first aperture member formed separately from the wall part and may be provided on a surface of the wall part. According to this, a degree of freedom in designing the first aperture part such as selection of a suitable material can be improved. Also, a positional relationship between the first aperture and the Fabry-Perot interference filter can be adjusted while the accuracy for positioning the Fabry-Perot interference filter in the housing can be relaxed by forming a large light incident opening in the housing. Further, even if a gap is formed between the first aperture part and the second aperture part, the light becoming stray light by being incident into the housing via the gap can be suppressed.

In the spectroscopic unit of one aspect of the present disclosure, the first aperture part may be fixed to the wall part. According to this, deviation in positional relationship between the first aperture and the Fabry-Perot interference filter due to vibration or the like can be prevented from occurring.

In the spectroscopic unit of one aspect of the present disclosure, the second aperture part may be a second aperture member formed separately from the first aperture part. According to this, a degree of freedom in designing the second aperture part and the first aperture part such as selection of a suitable material can be improved. Also, a positional relationship between the second aperture and the Fabry-Perot interference filter can be adjusted while the accuracy for positioning the Fabry-Perot interference filter in the housing can be relaxed by forming a large light incident opening in the housing. Also, a positional relationship between the second aperture and the first aperture can be adjusted.

In the spectroscopic unit of one aspect of the present disclosure, a cross-sectional shape of the first aperture in a direction perpendicular to the facing direction may be circular, and a cross-sectional shape of the second aperture in the direction perpendicular to the facing direction may be circular. According to this, an aperture having a desired performance can be easily formed.

In the spectroscopic unit of one aspect of the present disclosure, a region in the first aperture may be a space, and a region in the second aperture may be a space. According to this, loss of light while passing through the first aperture and the second aperture can be prevented.

The spectroscopic unit of one aspect of the present disclosure may further include a photodetector disposed in the housing and configured to detect light transmitted through the Fabry-Perot interference filter. According to this, dispersed light can be detected with high accuracy while suppressing occurrence of noise caused by stray light. Also, since the photodetector is disposed in the housing, reduction in size of the spectroscopic unit including the photodetector can be achieved.

The spectroscopic unit of one aspect of the present disclosure may further include a bandpass filter disposed between the first aperture and the Fabry-Perot interference filter, in which the first aperture part and the second aperture part may be configured so that all light which has passed through the first aperture and the second aperture is incident on the bandpass filter. According to this, all the light that has passed through the second aperture, the first aperture, and the opening is incident on the bandpass filter in a state in which a range of the incident angle is made small. Thereby, the bandpass filter functions appropriately, and light in a desired wavelength range is incident on the Fabry-Perot interference filter in a state in which the range of the incident angle is made small. Therefore, a resolution improves in the spectroscopic spectrum obtained by the Fabry-Perot interference filter.

In the spectroscopic unit of one aspect of the present disclosure, the first aperture part and the second aperture part may be configured so that all the light which has passed through the first aperture and the second aperture and transmitted through the bandpass filter is incident on the Fabry-Perot interference filter. According to this, generation of stray light in the housing can be suppressed.

In the spectroscopic unit of one aspect of the present disclosure, the bandpass filter may be separated from the first aperture part via the wall part. According to this, since the bandpass filter is disposed in the housing, the bandpass filter can be protected from physical interference or the like.

A spectroscopic module of the present disclosure includes the spectroscopic unit described above, a light source, and a package accommodating the housing of the spectroscopic unit and the light source, in which the first aperture and the second aperture are disposed to be adjacent to a light emitting part of the light source along an outer surface of the package.

According to the spectroscopic module, a reflection-type spectroscopic module in which the spectral accuracy by the Fabry-Perot interference filter is improved can be realized.

Advantageous Effects of Invention

According to the present disclosure, it is possible to provide a spectroscopic unit and a spectroscopic module in which the spectral accuracy by a Fabry-Perot interference filter can be improved.

DESCRIPTION OF EMBODIMENTS

Hereinafter, an embodiment of the present disclosure will be described in detail with reference to the drawings. In each of the drawings, the same or corresponding portions are denoted by the same Reference Signs, and Duplicate Descriptions Thereof Will be Omitted.

[Photodetection Device]

Figure 1:
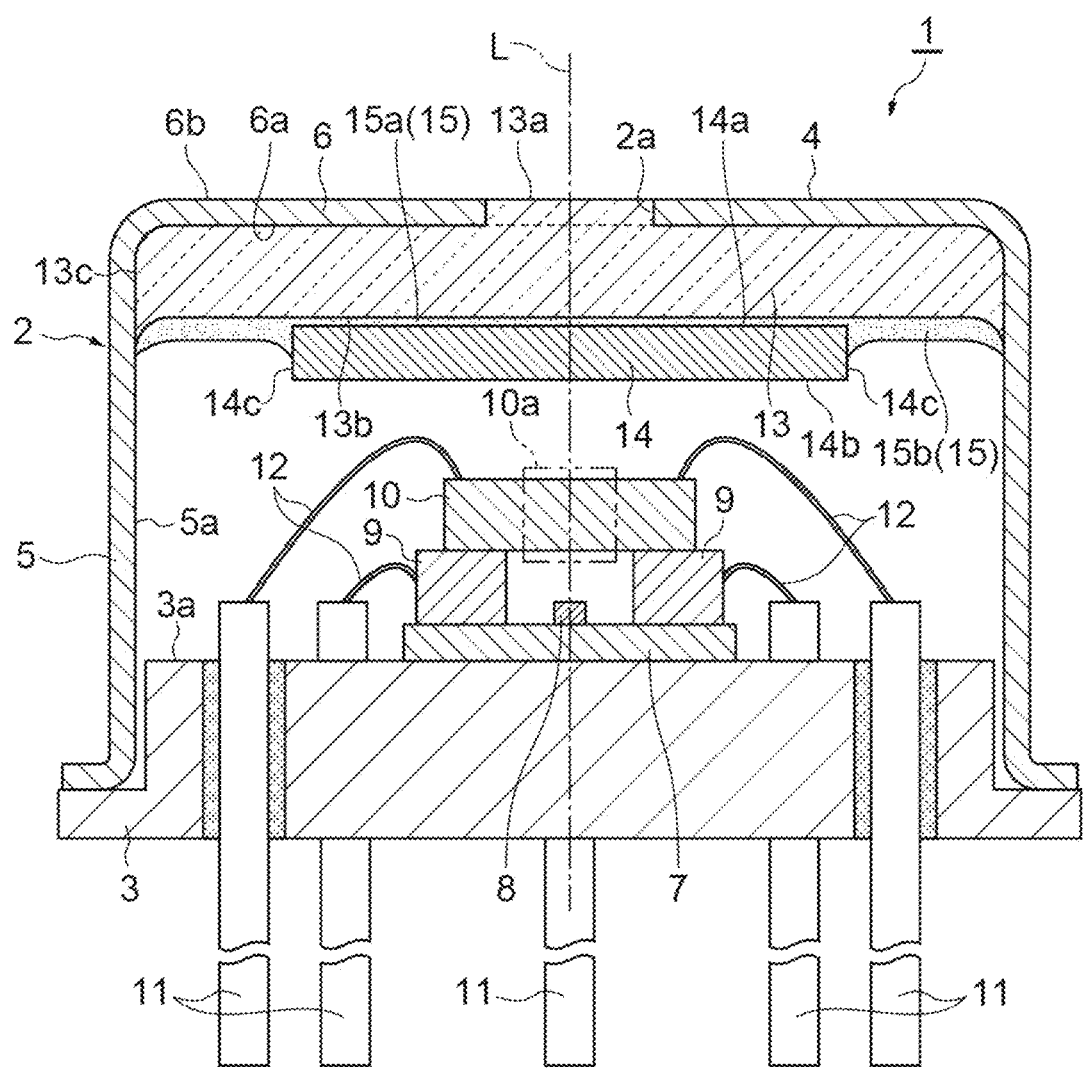
FIG. 1 is a cross-sectional view of a photodetection device applied to a spectroscopic module of one embodiment.

Prior to description of a spectroscopic module of one embodiment, a photodetection device applied to the spectroscopic module will be described. As illustrated in FIG. 1, a photodetection device 1 includes a housing 2. In the present embodiment, the housing 2 is a CAN package including a stein 3 and a cap 4. The cap 4 includes a side wall 5 and a top wall (wall part) 6 that are integrally formed. A material of the stein 3 and the cap 4 may be, for example, a metal. The cap 4 has a cylindrical shape with a line L as a center line. The side wall 5 of the cap 4 extends along the line L. The top wall 6 of the cap 4 is provided on one end side of the side wall 5 in a direction along the line L. The top wall 6 extends along a surface intersecting the line L.

A wiring substrate 7 is fixed to an inner surface 3a of the stein 3. A substrate material of the wiring substrate 7 may be, for example, silicon, a ceramic, quartz, glass, a plastic, or the like. A photodetector 8 and a temperature detector (not illustrated) such as a thermistor are mounted on the wiring substrate 7. The photodetector 8 is disposed in the housing 2 so that a center line of a light receiving part thereof coincides with the line L. The photodetector 8 detects light transmitted through a Fabry-Perot interference filter 10 to be described later. In the present embodiment, the photodetector 8 is an infrared detector and is constituted by a light receiving element such as, for example, an InGaAs photodiode, a thermopile, or a bolometer. Further, the photodetector 8 may be constituted by a light receiving element such as, for example, a Si photodiode when detecting ultraviolet light, visible light, and near-infrared light. Also, the photodetector 8 may be constituted by one light receiving element or may be constituted by a plurality of light receiving elements.

A plurality of spacers 9 are fixed on the wiring substrate 7. A material of the spacers 9 may be, for example, silicon, a ceramic, quartz, glass, a plastic, or the like. The Fabry-Perot interference filter 10 is fixed on the plurality of spacers 9. The Fabry-Perot interference filter 10 is disposed in the housing 2 so that a center line of a light transmission region 10a thereof coincides with the line L. That is, the housing 2 accommodates the Fabry-Perot interference filter 10. Further, in the present embodiment, the light transmission region 10a of the Fabry-Perot interference filter 10 has a circular shape when viewed from a direction parallel to the line L. Also, the plurality of spacers 9 may be formed integrally with the wiring substrate 7. Also, the Fabry-Perot interference filter 10 may be fixed on one spacer 9.

A plurality of lead pins 11 are fixed to the stein 3. The lead pins 11 each penetrate the stein 3 in a state of maintaining electrical insulating properties and airtightness with the stein 3. The lead pins 11 are each electrically connected to an electrode pad of the wiring substrate 7 and a terminal of the Fabry-Perot interference filter 10 via a wire 12. Thereby, input/output of electrical signals or the like with respect to the Fabry-Perot interference filter 10, the photodetector 8, and the temperature detector is made possible.

An opening 2a is formed in the housing 2. The opening 2a is formed in the top wall 6 of the cap 4 so that a center line thereof coincides with the line L. The opening 2a faces the light transmission region 10a of the Fabry-Perot interference filter 10 in the direction parallel to the line L. In the present embodiment, the opening 2a has a circular shape when viewed from the direction parallel to the line L. A light transmitting member 13 is joined to an inner surface 6a of the top wall 6 to close the opening 2a. A material of the light transmitting member 13 may be, for example, glass or the like. The light transmitting member 13 includes a light incident surface 13a and a light emitting surface 13b facing each other in the direction parallel to the line L, and a side surface 13c. The light incident surface 13a is substantially coplanar with an outer surface (surface) 6b of the top wall 6 of the cap 4 at the opening 2a. The side surface 13c is in contact with an inner surface 5a of the side wall 5 of the cap 4. Such a light transmitting member 13 is formed by melting glass pellets disposed on an inner side of the cap 4 with the opening 2a on a downward side.

A bandpass filter 14 is fixed to the light emitting surface 13b of the light transmitting member 13 by an adhesive member 15 made of a light transmitting material. The bandpass filter 14 selectively transmits light in a measurement wavelength range (light in a predetermined wavelength range that needs to be incident on the light transmission region 10a of the Fabry-Perot interference filter 10) of the photodetection device 1 in light transmitted through the light transmitting member 13. In the present embodiment, the bandpass filter 14 has, for example, a quadrangular plate shape. The bandpass filter 14 includes a light incident surface 14a and a light emitting surface 14b facing each other in the direction parallel to the line L, and four side surfaces 14c. The bandpass filter 14 is constituted by a light transmitting member made of, for example, silicon, glass, or the like and a dielectric multilayer film formed on a surface of the light transmitting member. The dielectric multilayer film is formed of a film formed of a high-refractive material (for example, $TiO_2$, $Ta_2O_5$, or the like) and a film formed of a low-refractive material (for example, $SiO_2$, $MgF_2$, or the like).

The adhesive member 15 includes a first portion 15a and a second portion 15b. The first portion 15a is a portion of the adhesive member 15 disposed between the light emitting surface 13b of the light transmitting member 13 and the light incident surface 14a of the bandpass filter 14. The second portion 15b is a portion of the adhesive member 15 disposed between the side surface 14c of the bandpass filter 14 and the inner surface 5a of the side wall 5 of the cap 4 on the light emitting surface 13b of the light transmitting member 13.

In the photodetection device 1 configured as described above, when light is incident on the bandpass filter 14 from the outside of the housing 2 through the opening 2a, the light transmitting member 13, and the adhesive member 15, only light in a predetermined wavelength range passes through the bandpass filter 14. The light transmitted through the bandpass filter 14 is incident on the light transmission region 10a of the Fabry-Perot interference filter 10, and light having a wavelength corresponding to a distance between a first mirror part 35 and a second mirror part 36, which will be described later, passes through the light transmission region 10a. The light transmitted through the light transmission region 10a is incident on the light receiving part of the photodetector 8 and then detected by the photodetector 8. Therefore, the photodetector 8 detects an intensity of the light transmitted through the light transmission region 10a while changing a distance between the first mirror part 35 and the second mirror part 36 in the Fabry-Perot interference filter 10, and thereby a spectroscopic spectrum can be obtained.

[Fabry-Perot Interference Filter]

Figure 2:
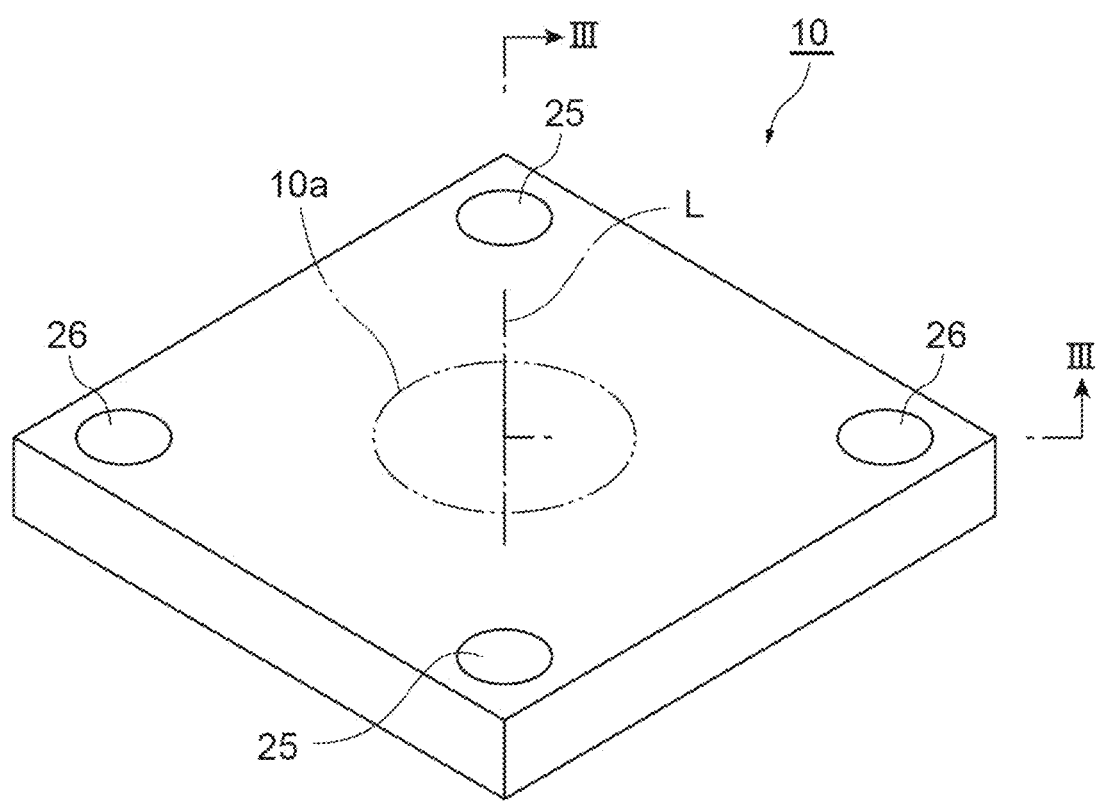
FIG. 2 is a perspective view of a Fabry-Perot interference filter illustrated in FIG. 1.
Figure 3:
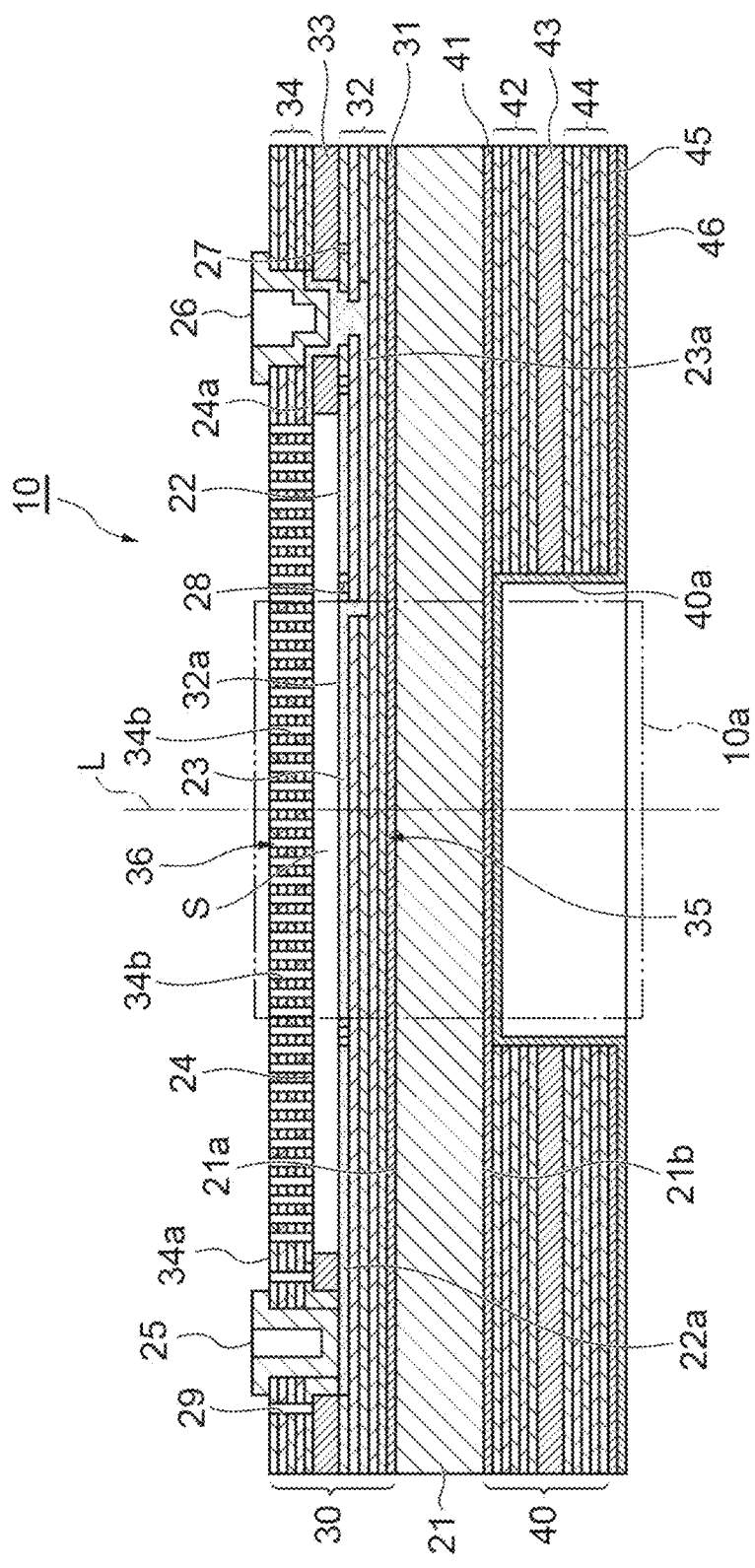
FIG. 3 is a cross-sectional view along line III-III illustrated in FIG. 2.

The Fabry-Perot interference filter 10 described above will be described in more detail. As illustrated in FIGS. 2 and 3, the light transmission region 10a that transmits light having a wavelength according to a distance between the first mirror part 35 and the second mirror part 36 is provided in the Fabry-Perot interference filter 10. The light transmission region 10a is, for example, a columnar region with the line L as a center line.

The Fabry-Perot interference filter 10 includes a substrate 21. The substrate 21 has, for example, a rectangular plate shape. A material of the substrate 21 may be, for example, silicon, quartz, glass, or the like. The substrate 21 has a first surface 21a and a second surface 21b facing each other in the direction parallel to the line L. The first surface 21a is a surface on a light incident side (on the bandpass filter 14 side). The second surface 21b is a surface on a light emitting side (on the photodetector 8 side).

A first layer structure 30 is disposed on the first surface 21a of the substrate 21. The first layer structure 30 is configured by laminating a first antireflection layer 31, a first laminate 32, a first intermediate layer 33, and a second laminate 34 in that order on the first surface 21a. A gap (air gap) S is formed between the first laminate 32 and the second laminate 34 by the first intermediate layer 33 having a frame shape. When the material of the substrate 21 may be silicon, a material of the first antireflection layer 31 and the first intermediate layer 33 may be, for example, silicon oxide. A thickness of the first intermediate layer 33 is, for example, tens of nanometers to tens of micrometers.

A portion of the first laminate 32 corresponding to the light transmission region 10a functions as the first mirror part 35. The first laminate 32 is formed by alternately laminating a plurality of polysilicon layers and a plurality of silicon nitride layers layer by layer. An optical thickness of each of the polysilicon layers and the silicon nitride layers constituting the first mirror part 35 is preferably an integral multiple of ¼ of a central transmission wavelength of light transmitting through the light transmission region 10a. Further, the first mirror part 35 may be disposed on the first surface 21a of the substrate 21 without interposing the first antireflection layer 31.

A portion of the second laminate 34 corresponding to the light transmission region 10a functions as the second mirror part 36. The second mirror part 36 faces the first mirror part 35 via a gap S in the direction parallel to the line L. The second laminate 34 is formed by alternately laminating a plurality of polysilicon layers and a plurality of silicon nitride layers layer by layer. An optical thickness of each of the polysilicon layers and the silicon nitride layers constituting the second mirror part 36 is preferably an integral multiple of ¼ of a central transmission wavelength of light transmitting through the light transmission region 10a.

Further, in the first laminate 32 and the second laminate 34, a silicon oxide layer may be disposed instead of the silicon nitride layer. Also, materials of the layers constituting the first laminate 32 and the second laminate 34 are not limited to the above-described materials, and may include, for example, titanium oxide, tantalum oxide, zirconium oxide, magnesium fluoride, aluminum oxide, calcium fluoride, silicon, germanium, zinc sulfide, and the like.

A plurality of through holes 34b are formed in a portion of the second laminate 34 corresponding to the gap S. Each of the through holes 34b reaches the gap S from a surface 34a on a side of the second laminate 34 opposite to the first laminate 32. The plurality of through holes 34b are formed to such an extent that they do not substantially affect the function of the second mirror part 36. The plurality of through holes 34b are used to form the gap S by removing a part of the first intermediate layer 33 by etching.

A first electrode 22 is formed in the first laminate 32 to surround the light transmission region 10a. A second electrode 23 is formed in the first laminate 32 to include the light transmission region 10a. The first electrode 22 and the second electrode 23 are formed by causing a polysilicon layer of the first laminate 32 closest to the gap S to be doped with impurities to lower a resistance thereof. In the second laminate 34, a third electrode 24 is formed to face the first electrode 22 and the second electrode 23 via the gap S. The third electrode 24 is formed by causing a polysilicon layer of the second laminate 34 closest to the gap S to be doped with impurities to lower a resistance thereof. Further, the second electrode 23 need only have substantially the same size as the light transmission region 10a or a size equal to or larger than that of the light transmission region 10a.

A pair of first terminals 25 and a pair of second terminals 26 are provided in the first layer structure 30. The pair of first terminals 25 face each other with the light transmission region 10a interposed therebetween. The first terminals 25 are each disposed in a through hole extending from the surface 34a of the second laminate 34 to the first laminate 32. The first terminals 25 are each electrically connected to the first electrode 22 via a wiring 22a formed in the first laminate 32. The pair of second terminals 26 face each other with the light transmission region 10a interposed therebetween in a direction perpendicular to a direction in which the pair of first terminals 25 face each other. The second terminals 26 are each disposed in a through hole extending from the surface 34a of the second laminate 34 to the inside of the first intermediate layer 33. The second terminals 26 are each electrically connected to the second electrode 23 via a wiring 23a formed in the first laminate 32 and electrically connected to the third electrode 24 via a wiring 24a formed in the second laminate 34.

Trenches 27 and 28 are provided on a surface 32a of the first laminate 32 on the second laminate 34 side. The trench 27 extends in an annular shape to surround a connection portion of the wiring 23a with the second terminal 26. The trench 27 electrically insulates the first electrode 22 from the wiring 23a. The trench 28 extends in an annular shape along an inner edge of the first electrode 22. The trench 28 electrically insulates the first electrode 22 from a region on an inner side of the first electrode 22 (that is, a region in which the second electrode 23 is present). A trench 29 is provided on the surface 34a of the second laminate 34. The trench 29 extends in an annular shape to surround the first terminal 25. The trench 29 electrically insulates the first terminal 25 from the third electrode 24. A region in each of the trenches 27, 28, and 29 may be an insulating material or may be a gap.

A second layer structure 40 is disposed on the second surface 21b of the substrate 21. The second layer structure 40 is configured by laminating a second antireflection layer 41, a third laminate 42, a second intermediate layer 43, and a fourth laminate 44 in that order on the second surface 21b. The second antireflection layer 41, the third laminate 42, the second intermediate layer 43, and the fourth laminate 44 have the same configurations as the first antireflection layer 31, the first laminate 32, the first intermediate layer 33, and the second laminate 34. That is, the second layer structure 40 has a laminated structure symmetrical with the first layer structure 30 with respect to the substrate 21. When the second layer structure 40 is configured to correspond to the first layer structure 30, the Fabry-Perot interference filter 10 warping is suppressed.

An opening 40a is formed in the third laminate 42, the second intermediate layer 43, and the fourth laminate 44 to include the light transmission region 10a. The opening 40a has, for example, a columnar shape with the line L as a center line and has substantially the same diameter as the light transmission region 10a. The opening 40a opens toward a light emitting side, and a bottom surface of the opening reaches the second antireflection layer 41. The opening 40a allows light transmitted through the first mirror part 35 and the second mirror part 36 to pass therethrough.

A light-shielding layer 45 is formed on a surface of the fourth laminate 44 on the light emitting side. A material of the light-shielding layer 45 may be, for example, aluminum or the like. A protective layer 46 is formed on a surface of the light-shielding layer 45 and an inner surface of the opening 40a. A material of the protective layer 46 may be, for example, aluminum oxide. Further, when a thickness of the protective layer 46 is set to 1 to 100 nm (preferably about 30 nm), an optical influence of the protective layer 46 can be ignored.

In the Fabry-Perot interference filter 10 configured as described above, when a voltage is applied between the first terminal 25 and the second terminal 26, a potential difference is generated between the first electrode 22 and the third electrode 24, and an electrostatic force corresponding to the potential difference is generated between the first electrode 22 and the third electrode 24. Thereby, the second mirror part 36 is attracted to the first mirror part 35 side fixed to the substrate 21, and a distance between the first mirror part 35 and the second mirror part 36 changes. At this time, since a potential difference is not generated between the second electrode 23 and the third electrode 24, flatness of the second mirror part 36 in the light transmission region 10a is secured. As described above, in the Fabry-Perot interference filter the distance between the first mirror part 35 and the second mirror part 36 is variable. Here, a wavelength of light transmitting through the light transmission region 10a depends on the distance between the first mirror part 35 and the second mirror part 36. Therefore, when a voltage applied between the first terminal 25 and the second terminal 26 is adjusted, a wavelength of light transmitting through the light transmission region 10a can be adjusted.

[Spectroscopic Module]

A spectroscopic module of one embodiment to which the above-described photodetection device 1 is applied will be described. In the following description, a direction in which the first mirror part 35 and the second mirror part 36 face each other (in the present embodiment, a direction parallel to the line L) is referred to as a direction A.

Figure 4:
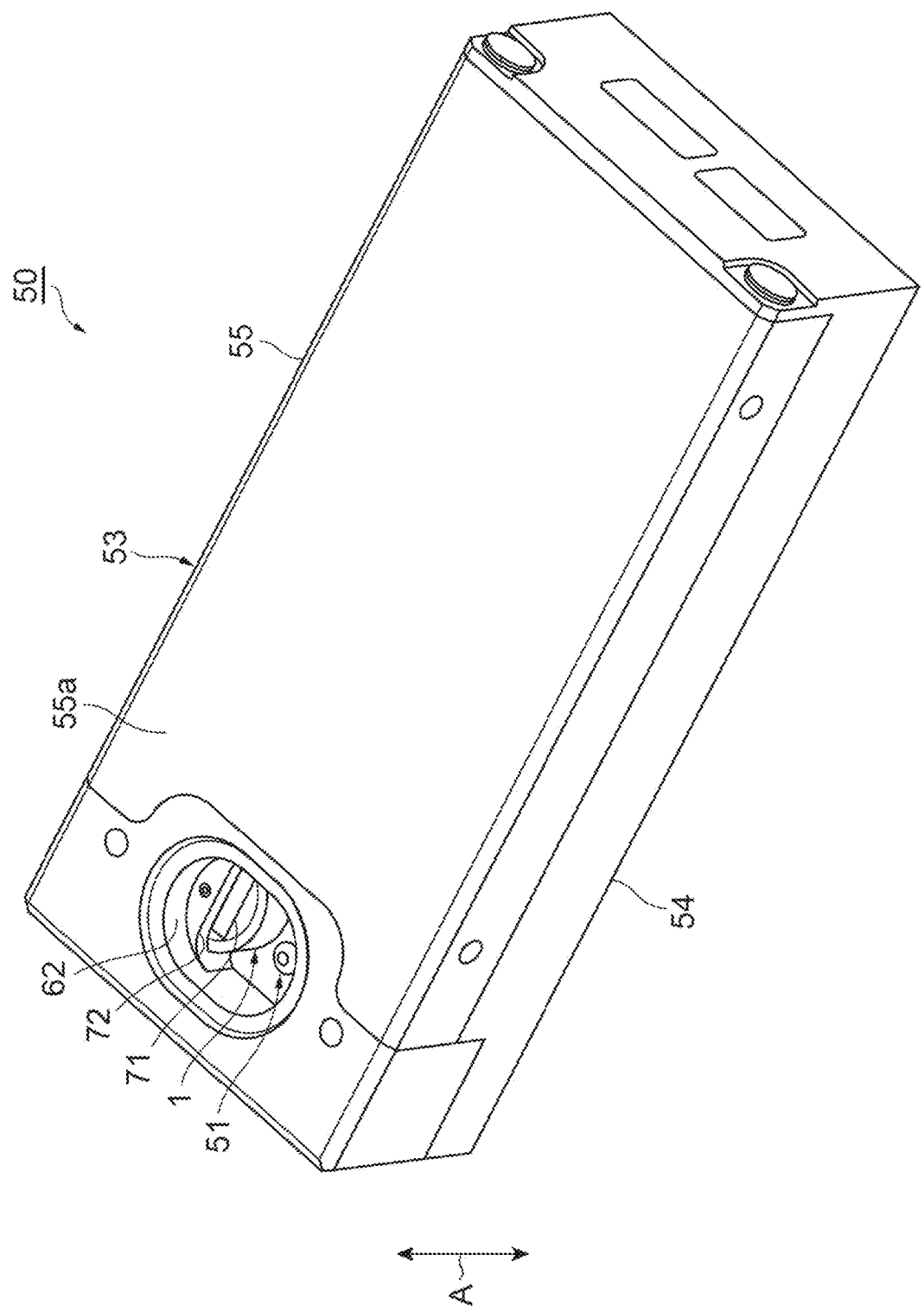
FIG. 4 is a perspective view of the spectroscopic module of one embodiment.
Figure 5:
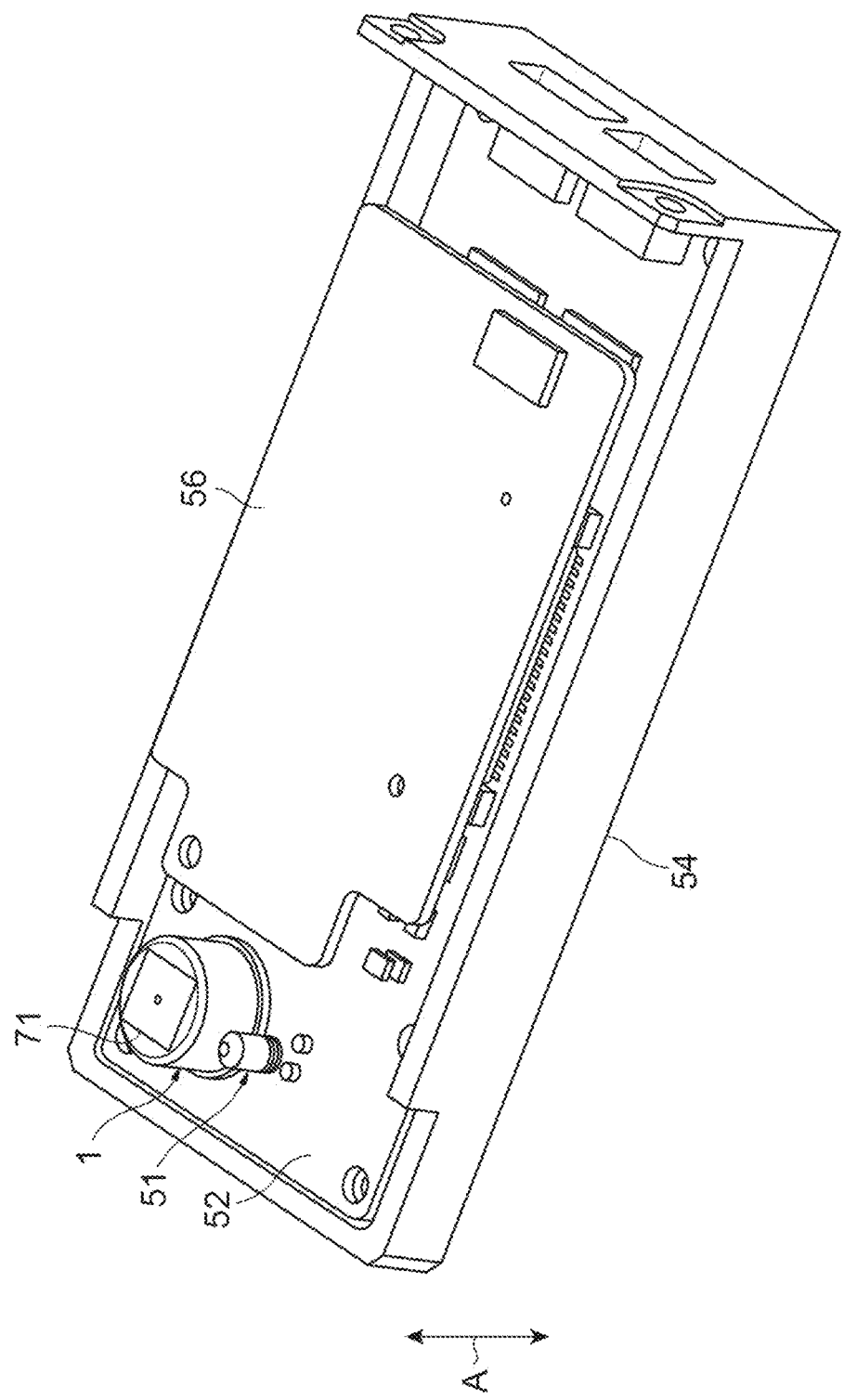
FIG. 5 is a perspective view of an internal structure of the spectroscopic module illustrated in FIG. 4.

As illustrated in FIGS. 4 and 5, the spectroscopic module 50 includes a photodetection device 1, a light source 51, a wiring board 52, and a package 53. The light source 51 emits light for irradiating an object. The light source 51 may be, for example, an infrared lamp that emits light in a wavelength range of near infrared to mid-infrared. The plurality of lead pins 11 of the photodetection device 1 and a plurality of lead pins of the light source 51 are electrically connected to the wiring board 52. The package 53 accommodates the photodetection device 1, the light source 51, the wiring board 52, the wiring substrate 56, and the like. The package 53 has, for example, a rectangular parallelepiped shape. The package 53 has a package main body 54 and a lid 55. The photodetection device 1, the light source 51, the wiring board 52, a wiring substrate 56, and the like are disposed in the package main body 54. The lid 55 has a planar outer surface 55a. In the spectroscopic module 50, irradiation of the object with light and detection of light reflected by the object can be performed in a state in which an outer surface of a cover 20 (see FIG. 7) is brought into contact with the object. Further, power is supplied to the spectroscopic module 50 via a general-purpose connector such as, for example, a USB (universal serial bus) socket. Also, the package 53 may also accommodate, for example, a wireless communication board, a battery case, or the like.

Figure 6:
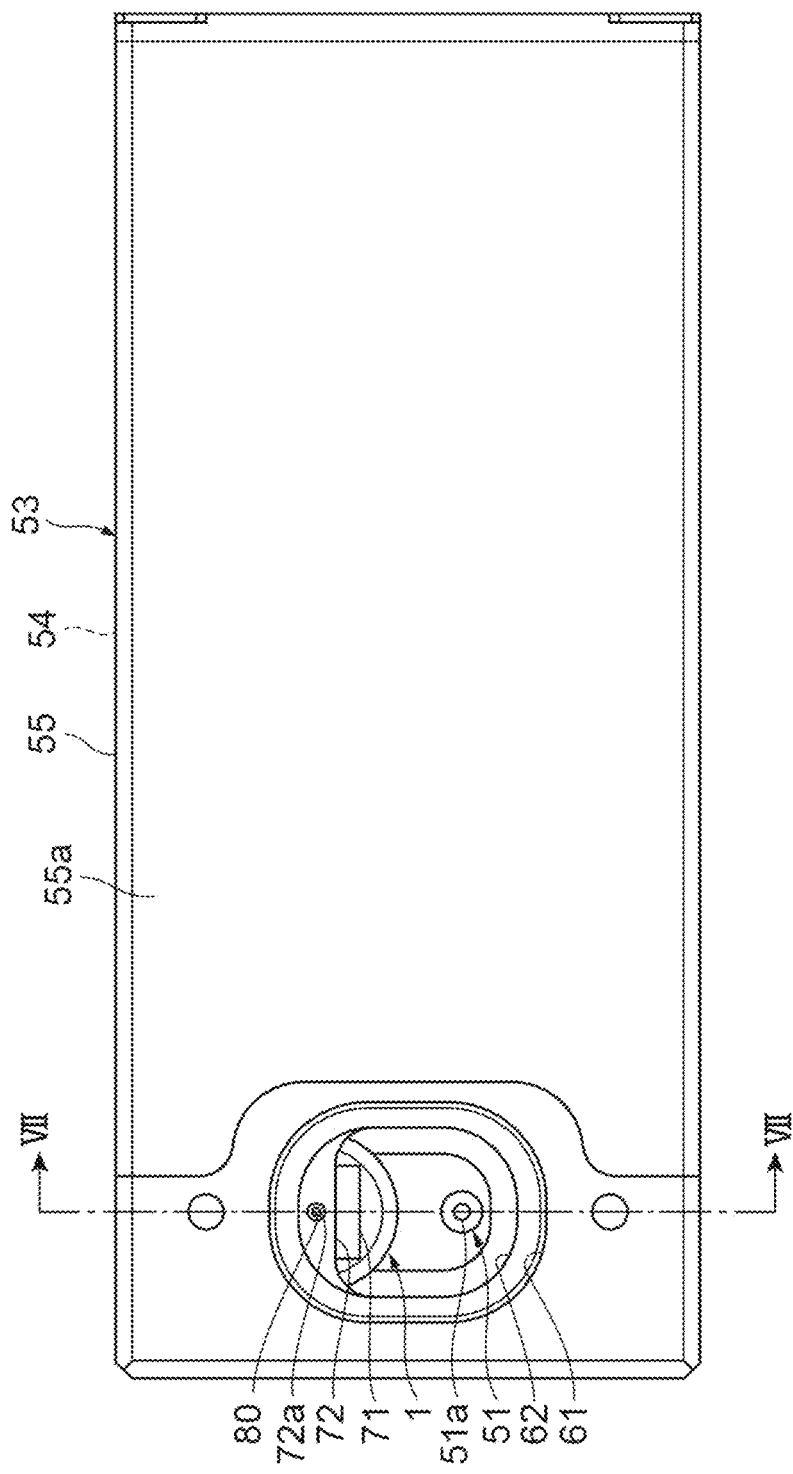
FIG. 6 is a plan view of the spectroscopic module illustrated in FIG. 4.
Figure 7:
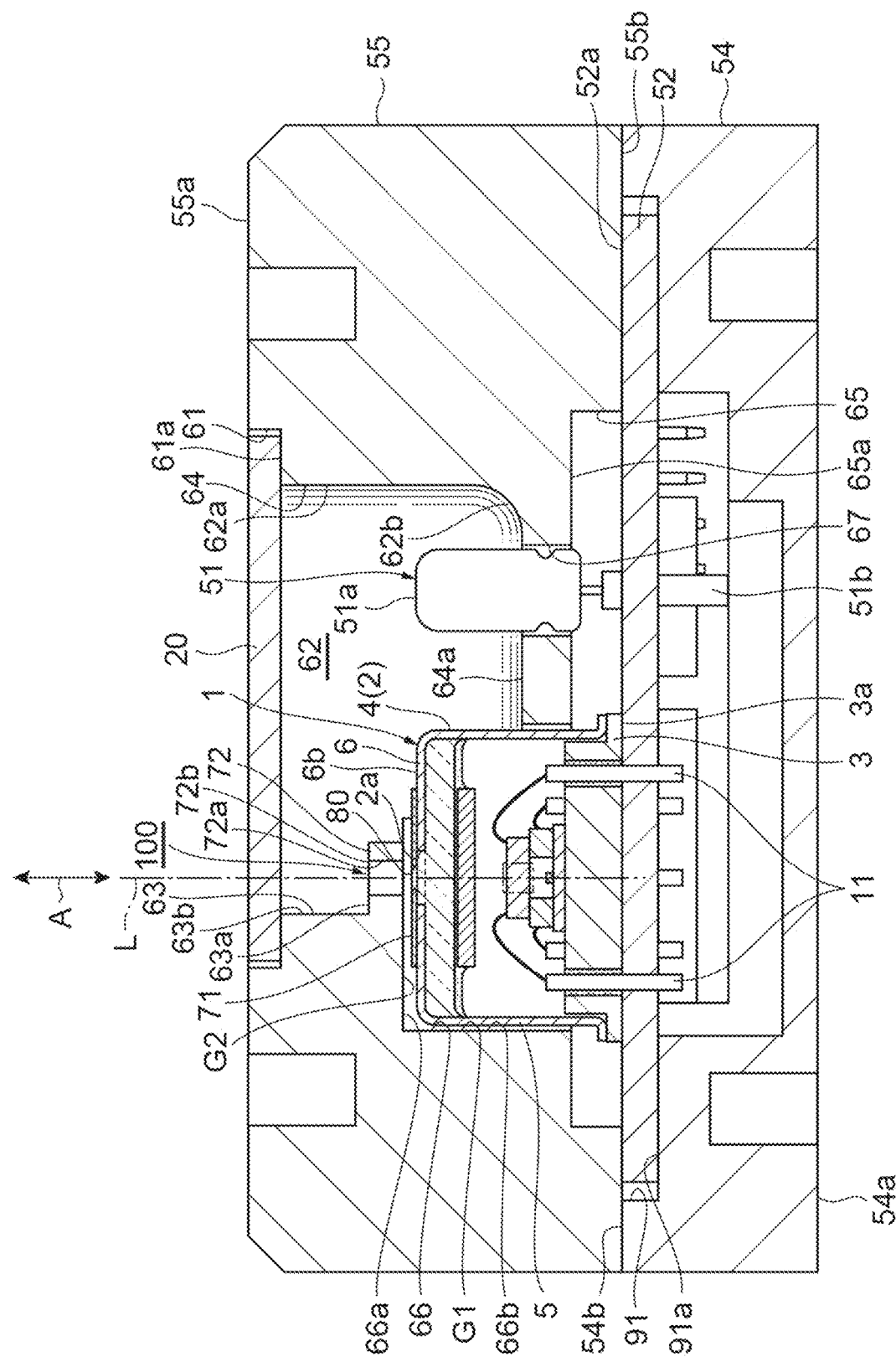
FIG. 7 is a cross-sectional view along line VII-VII illustrated in FIG. 6.

As illustrated in FIGS. 6 and 7, a recessed part 91 is formed on an inner surface 54b of the package main body 54. The wiring board 52 is placed on a bottom surface 91a of the recessed part 91. The wiring board 52 is placed on the bottom surface 91a of the recessed part 91 so that a surface 52a of the wiring board 52 is coplanar with the inner surface 54b of the package main body 54. The housing 2 is placed on the surface 52a of the wiring board 52. The housing 2 is fixed to the wiring board 52 by the plurality of lead pins 11 that penetrate the wiring board 52 to be fixed to the wiring board 52. The light source 51 is fixed to the wiring board 52. The light source 51 is adjacent to the housing 2 in a direction perpendicular to the direction A. The light source 51 is fixed to the wiring board 52 by a lead pin holding part 51b that penetrates the wiring board 52 to be fixed to the wiring board 52 in a state of floating from the surface 52a of the wiring board 52.

A recessed part 61 is formed on the outer surface 55a of the lid 55. The cover (window glass) 20 formed of, for example, glass or the like is provided on a bottom surface 61a of the recessed part 61. An outer surface of the cover 20 may be coplanar with the outer surface 55a of the lid 55 or may slightly protrude with respect to the outer surface 55a. A recessed part 62 opening toward an outer side of the package 53 is formed on the bottom surface 61a of the recessed part 61. The recessed part 62 is constituted by a first portion 63 and a second portion 64. The second portion 64 is deeper than the first portion 63. A concave curved surface 62b is formed between a bottom surface 64a of the second portion 64 and a side surface 62a of the recessed part 62. The concave curved surface 62b has a shape corresponding to a round chamfered surface applied to a corner formed by the bottom surface 64a and the side surface 62a.

A recessed part 65 is formed on an inner surface 55b of the lid 55. A recessed part 66 opening toward an inner side of the package 53 is formed on a bottom surface 65a of the recessed part 65. When viewed from the direction A, an outer edge of the recessed part 66 is positioned outside an outer edge of the first portion 63 of the recessed part 62. The recessed part 66 communicates with the second portion 64 of the recessed part 62. A portion of the lid 55 between the first portion 63 of the recessed part 62 and the recessed part 66 constitutes a second aperture part 72. That is, the second aperture part 72 is integrally formed with the lid 55. The second aperture part 72 protrudes from the side surface 63b of the first portion 63 of the recessed part 62. A second aperture 72a is formed in the second aperture part 72.

A hole 67 is formed on the bottom surface 64a of the second portion 64 of the recessed part 62. The hole 67 opens to the bottom surface 64a of the second portion 64 and the bottom surface 65a of the recessed part 65. When viewed from the direction A, the hole 67 has a size including the second aperture 72a. That is, when shapes of the hole 67 and the second aperture 72a in a cross section perpendicular to the direction A are each circular, a minimum diameter of the hole 67 in the cross section is larger than a maximum diameter of the second aperture 72a in the cross section.

The lid 55 is attached to the package main body 54 so that the inner surface 55b is in contact with the inner surface 54b of the package main body 54. In a state in which the lid 55 is attached to the package main body 54, the housing 2 of the photodetection device 1 is disposed in the recessed part 66 of the lid 55, and the light source 51 is disposed in the hole 67 of the lid 55. More specifically, the cap 4 of the housing 2 is disposed in the recessed part 66 with the opening 2a of the housing 2 facing the second aperture 72a. Also, the light source 51 is disposed in the hole 67 in a state in which the light emitting part 51a of the light source 51 is disposed in the second portion 64 of the recessed part 62. In a state in which the lid 55 is attached to the package main body 54, at least a part of the photodetection device 1 and the light source 51 are exposed in the recessed part 62 of the lid 55.

A gap is formed between the lid 55 and the housing 2. More specifically, in a state in which the lid 55 is attached to the package main body 54, a gap G1 is formed between a side surface 66b of the recessed part 66 of the lid 55 and the side wall 5 of the cap 4 of the housing 2. Also, in a state in which the lid 55 is attached to the package main body 54, a gap G2 is formed between a bottom surface 66a of the recessed part 66 of the lid 55 and the top wall 6 of the cap 4. A length of the gap G2 in the direction A is, for example, about 0.25 mm A first aperture part 71 is provided on the outer surface 6b of the top wall 6 of the housing 2. The first aperture part 71 is disposed in the gap G2. A first aperture 80 is formed in the first aperture part 71.

In the spectroscopic module 50 configured as described above, a light incident opening 72b of the second aperture 72a, a light incident opening 80b of the first aperture 80 (see FIG. 8), and the light emitting part 51a of the light source 51 are disposed in the recessed part 62. The second aperture 72a and the first aperture 80 are disposed to be adjacent to the light emitting part 51a of the light source 51 along the outer surface 55a of the lid 55.

The first aperture 80 and the second aperture 72a described above will be described in more detail. In the present embodiment, the bandpass filter 14 is separated from the first aperture part 71 via the top wall 6 of the cap 4 which is a part of the housing 2. The bandpass filter 14 is disposed between the first aperture 80 and the Fabry-Perot interference filter 10. In the present embodiment, a spectroscopic unit 100 is constituted by the housing 2, the first aperture part 71, the second aperture part 72, the bandpass filter 14, the Fabry-Perot interference filter 10, and the photodetector 8.

Figure 8:
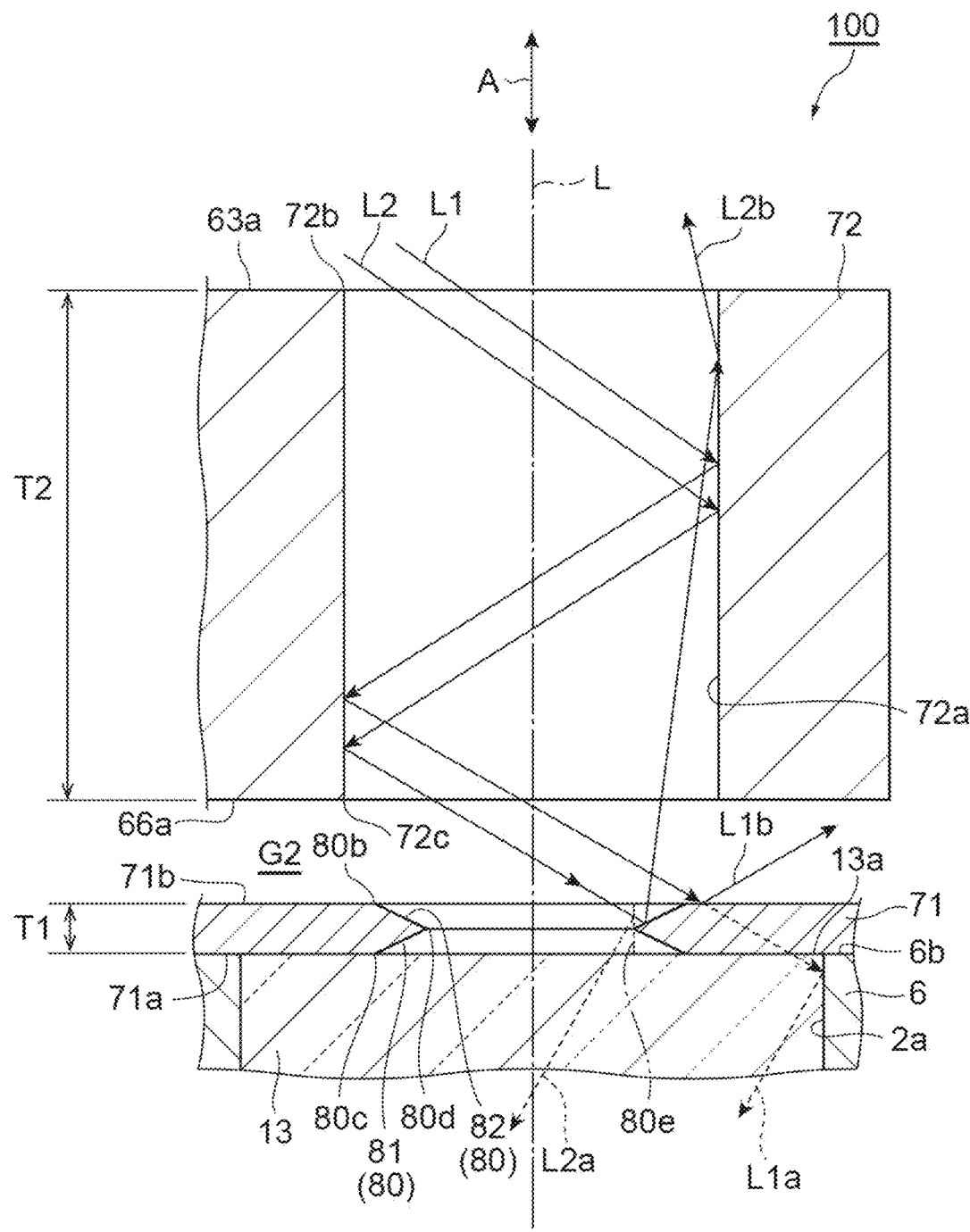
FIG. 8 is a cross-sectional view of a spectroscopic unit illustrated in FIG. 7.

As illustrated in FIG. 8, the first aperture part 71 is provided on a side opposite to the Fabry-Perot interference filter 10 with respect to the top wall 6. The first aperture part 71 has, for example, a quadrangular plate shape (see FIG. 5). A thickness of the first aperture part 71 is, for example, about 0.1 mm to 0.2 mm. The first aperture part 71 has a first surface 71a and a second surface 71b on a side opposite to the first surface 71a. The first aperture part 71 is disposed between the top wall 6 and the second aperture part 72 so that the first surface 71a faces the outer surface 6b of the top wall 6 and the second surface 71b faces the second aperture part 72. The first surface 71a of the first aperture part 71 is in contact with the outer surface 61b of the top wall 6. The first aperture part 71 is fixed to the outer surface 6b of the top wall 6 by, for example, resin bonding or the like. The first aperture part 71 may be provided on the outer surface 61b of the top wall 6 via an adhesive member such as a resin. The first aperture part 71 may be provided on the outer surface 6b of the top wall 6 via a member such as a thin plate. As described above, the first aperture part 71 is a first aperture member formed separately from the top wall 6. A material of the first aperture part 71 may be, for example, stainless steel or the like.

The first aperture 80 formed in the first aperture part 71 is a through hole penetrating the first aperture part 71. The first aperture opens to the first surface 71a and the second surface 71b. The first aperture 80 is an opening formed by etching. A region in the first aperture 80 is space. The first aperture 80 faces the opening 2a in the direction A. A center line of the first aperture 80 coincides with the line L. The light incident opening 80b of the first aperture 80 is a portion of the first aperture 80 that opens to the second surface 71b. A light emitting opening 80c of the first aperture 80 is a portion of the first aperture 80 that opens to the first surface 71a.

The first aperture 80 includes a first tapered portion 81 and a second tapered portion 82. The first tapered portion 81 reaches the first surface 71a of the first aperture part 71 on the top wall 6 side and extends toward the first surface 71a. The second tapered portion 82 reaches the second surface 71b of the first aperture part 71 on the second aperture part 72 side and extends toward the second surface 71b.

In the present embodiment, the first tapered portion 81 and the second tapered portion 82 each have a truncated cone shape. That is, cross-sectional shapes of the first tapered portion 81 and the second tapered portion 82 in the direction perpendicular to the direction A are each circular. A cross-sectional shape of the first aperture 80 in the direction perpendicular to the direction A is circular. A diameter of the first tapered portion 81 gradually increases from the second surface 71b side toward the first surface 71a. A diameter of the second tapered portion 82 gradually increases from the first surface 71a side toward the second surface 71b. A rate of change in the diameter of the first tapered portion 81 is the same as a rate of change in the diameter of the second tapered portion 82. That is, an angle between the first tapered portion 81 and the first surface 71a is the same as an angle between the second tapered portion 82 and the second surface 71b.

The first tapered portion 81 and the second tapered portion 82 are in contact with each other at a central position of the first aperture part 71 in the direction A. An outer edge 80d of the first aperture 80 is formed by an edge formed by the first tapered portion 81 and the second tapered portion 82 being in contact with each other. When viewed from the direction A, the outer edge 80d has a circular shape. The outer edge of the first aperture 80 refers to an innermost edge of the first aperture 80 when viewed from the direction A. The first tapered portion 81 and the second tapered portion 82 are plane-symmetrical with respect to a plane (a plane including the outer edge 80d) that divides the first aperture part 71 into two in the direction A.

The second aperture part 72 is provided on a side opposite to the top wall 6 with respect to the first aperture part 71. The second aperture part 72 is separated from the second surface 71b of the first aperture part 71. The second aperture part 72 is a second aperture member formed separately from the first aperture part 71. The second aperture 72a formed in the second aperture part 72 is a through hole penetrating the second aperture part 72. The second aperture 72a opens to a bottom surface 63a of the first portion 63 of the recessed part 62 and the bottom surface 66a of the recessed part 66 which are formed in the lid 55.

A region in the second aperture 72a is space. The second aperture 72a faces the first aperture 80 in the direction A. A center line of the second aperture 72a coincides with the line L. The light incident opening 72b of the second aperture 72a is a portion of the second aperture 72a that opens to the bottom surface 63a of the first portion 63 of the recessed part 62. A light emitting opening 72c of the second aperture 72a is a portion of the second aperture 72a that opens to the bottom surface 66a of the recessed part 66. In the present embodiment, a region in the second aperture 72a has a columnar shape. That is, a cross-sectional shape of the second aperture 72a in the direction perpendicular to the direction A is circular.

The second aperture part 72 is configured such that a value (an aspect ratio of the second aperture 72a) obtained by dividing a length T2 of the second aperture 72a in the direction A by a width of the second aperture 72a in the direction perpendicular to the direction A is 0.5 or more. The length of the second aperture 72a in the direction A refers to a distance between the light incident opening 72b and the light emitting opening 72c. The width of the second aperture 72a in the direction perpendicular to the direction A refers to a value of ½ of a sum of an effective diameter of the light incident opening 72b and an effective diameter of the light emitting opening 72c. The effective diameter of the light incident opening 72b refers to a diameter thereof when a shape of the light incident opening 72b is circular, and a diameter of a circle having an area thereof when the shape of the light incident opening 72b is other than circular. Similarly, the effective diameter of the light emitting opening 72c refers to a diameter when a shape of the light emitting opening 72c is circular, and a diameter of a circle having an area thereof when the shape of the light emitting opening 72c is other than circular.

A distance between the second aperture part 72 and the first aperture part 71 in the direction A (a distance between the bottom surface 66a and the second surface 71b) is smaller than the length T2 of the second aperture 72a in the direction A. The length T2 of the second aperture 72a is, for example, about 1 mm. The length T2 of the second aperture 72a in the direction A is larger than a length T1 of the first aperture 80 in the direction A. That is, a thickness of the second aperture part 72 is larger than a thickness of the first aperture part 71. The length of the first aperture 80 in the direction A refers to a distance between the light incident opening 80b and the light emitting opening 80c. The length T1 of the first aperture 80 is, for example, about 0.1 mm to 0.2 mm.

When viewed from the direction A, an outer edge of the opening 2a formed in the top wall 6 is positioned outside an outer edge of the second aperture 72a. That is, a diameter of the opening 2a is larger than a diameter of the second aperture 72a. When viewed from the direction A, the outer edge of the second aperture 72a is positioned inside an outer edge of the light transmission region 10a of the Fabry-Perot interference filter 10. That is, the diameter of the second aperture 72a is smaller than a diameter of the light transmission region 10a. When viewed from the direction A, the outer edge 80d of the first aperture 80 is positioned inside each of the outer edge of the opening 2a, the outer edge of the second aperture 72a, and the outer edge of the light transmission region 10a of the Fabry-Perot interference filter 10. That is, the diameter of the outer edge 80d is smaller than each of the diameter of the opening 2a, the diameter of the second aperture 72a, and the diameter of the light transmission region 10a. The distance between the second aperture part 72 and the first aperture part 71 in the direction A is smaller than the diameter of the outer edge of the second aperture 72a. The diameter of the opening 2a is, for example, about 1.5 mm. The diameter of the outer edge 80d of the first aperture 80 is, for example, about 0.5 mm. The diameter of the outer edge of the second aperture 72a is, for example, about 1.0 mm.

An incident angle and an emitting angle of light passing through the second aperture 72a and the first aperture 80 (light passing through the second aperture 72a and the first aperture 80 in an ideal state in which reflections or the like by an inner surface of the second aperture 72a, and an inner surface of the first tapered portion 81 and an inner surface of the second tapered portion 82 of the first aperture 80 are ignored) are defined by the light incident opening 72b of the second aperture 72a and the outer edge 80d of the first aperture 80. In other words, the light incident opening 72b and the outer edge 80d are portions that define the incident angle and the emitting angle of the light passing through the second aperture 72a and the first aperture 80 (the light passing through the second aperture 72a and the first aperture 80 in an ideal state in which reflections or the like by the inner surface of the second aperture 72a, and the inner surface of the first tapered portion 81 and the inner surface of the second tapered portion 82 of the first aperture 80 are ignored).

The first aperture part 71 and the second aperture part 72 are configured so that all the light that has passed through the second aperture 72a and the first aperture 80 (the light that has passed through the second aperture 72a and the first aperture 80 in an ideal state in which reflections or the like by the inner surface of the second aperture 72a, and the inner surface of the first tapered portion 81 and the inner surface of the second tapered portion 82 of the first aperture 80 are ignored) is incident on the bandpass filter 14. Further, the first aperture part 71 and the second aperture part 72 are configured so that all the light that has passed through the second aperture 72a and the first aperture 80 and transmitted through the bandpass filter 14 is incident on the Fabry-Perot interference filter 10.

[Operation and Effects]

As described above, in the spectroscopic unit 100, the length T2 of the second aperture 72a in the direction A is larger than the length T1 of the first aperture 80 in the direction A, and when viewed from the direction A, the outer edge 80d of the first aperture 80 is positioned inside each of the outer edge of the opening 2a and the outer edge of the second aperture 72a. Therefore, light that has passed through the second aperture 72a, the first aperture 80, and the opening 2a is incident on the Fabry-Perot interference filter 10 in a state in which a range of the incident angle is made small. Thereby, the Fabry-Perot interference filter 10 can be made to function appropriately. Also, in the spectroscopic unit 100, the outer edge 80d of the first aperture 80 is positioned inside the outer edge of the second aperture 72a when viewed from the direction A, and the first aperture 80 includes the first tapered portion 81 and the second tapered portion 82. Therefore, light incident on the second aperture 72a at a large incident angle becoming stray light by being incident into the housing 2 while being reflected by the inner surface of the second aperture 72a can be suppressed. As described above, according to the spectroscopic unit 100, a resolution can be improved in a spectroscopic spectrum obtained by the Fabry-Perot interference filter 10, and the spectral accuracy by the Fabry-Perot interference filter 10 can be improved.

The above-described effect will be described in more detail. As illustrated in FIG. 8, for example, when light L1 is incident on the second aperture 72a at a large incident angle, the light L1 travels toward the housing 2 while being reflected by the inner surface of the second aperture 72a. Here, for example, when the outer edge 80d of the first aperture 80 is positioned outside the outer edge of the second aperture 72a, or when the first aperture part 71 is not present, the light L1 is reflected by the inner surface of the opening 2a (or passes directly through the opening 2a) and then is incident into the housing 2 (see the light L1a illustrated by the dotted line). On the other hand, in the spectroscopic unit 100, since the outer edge 80d of the first aperture 80 is positioned inside the outer edge of the second aperture 72a, the light L1 is reflected by the second surface 71b of the first aperture part 71 and is not incident into the housing 2 (see light L1b illustrated by the solid line).

Also, for example, when light L2 is incident on the second aperture 72a at a large incident angle, the light L2 travels toward the housing 2 while being reflected by the inner surface of the second aperture 72a. Here, for example, when the first aperture 80 does not have the first tapered portion 81 and the second tapered portion 82, and the region in the first aperture 80 has a columnar shape (see the portion illustrated by the two-dot dashed line), the light L2 is reflected by an inner surface 80e of the first aperture 80 and then is incident into the housing 2 (see light L2a illustrated by the dotted line). On the other hand, in the spectroscopic unit 100, since the first aperture 80 includes the first tapered portion 81 and the second tapered portion 82, the light L2 is reflected by the inner surface of the second tapered portion 82 toward a side opposite to the inside of the housing 2 and is not incident into the housing 2 (see light L2b illustrated by the solid line).

Incidentally, in a spectroscopic module such as the spectroscopic module 50, even when there is dimensional variation in each part, it is required to surely assemble the parts. As a result, gaps such as the gap G1 and the gap G2 may be formed in the spectroscopic module 50 after the parts are assembled. When the gap G2 is formed between the second aperture part 72 and the top wall 6, there is a likelihood that light incident via the gap G2 (for example, light not reflected by the object) will be incident into the housing 2 and become stray light. In the spectroscopic module 50, the first aperture part 71 is provided on the outer surface 6b of the top wall 6. According to this, as described above, not only the light incident on the second aperture 72a at a large incident angle but also the light incident via the gap G2 becoming stray light by being incident into the housing 2 can be suppressed. In other words, even when the gap G2 is difficult to be made zero, entering of stray light into the housing 2 can be reduced by disposing the first aperture part 71 in the gap G2. Thereby, an effect of suppressing entering of stray light that is the same as that when the gap G2 is zero can be obtained.

Also, in the spectroscopic unit 100, the first aperture 80 includes both the first tapered portion 81 and the second tapered portion 82. According to this, even when light incident on the second aperture 72a at a large incident angle travels into the second aperture 72a while being reflected by the inner surface of the second aperture 72a, the light is reflected by the inner surface of the second tapered portion 82 toward a side opposite to the inside of the housing 2. Therefore, the light incident on the second aperture 72a at a large incident angle becoming stray light by being incident into the housing 2 while being reflected by the inner surface of the second aperture 72a can be reliably suppressed. Also, even if the first aperture part 71 is provided in an opposite direction (misassembled), the above-described effect can be obtained. That is, even when the first aperture part 71 is provided so that the first surface 71a faces the second aperture part 72 and the second surface 71b faces the outer surface 6b of the top wall 6, the light L2 can be reflected as the light L2b by the first tapered portion 81 instead of the second tapered portion 82 as described above. Further, the first tapered portion 81 and the second tapered portion 82 are plane-symmetrical with respect to a plane that divides the first aperture part 71 into two in the direction A. According to this, as described above, even when the first aperture part 71 is provided in an opposite direction, the same function as the second tapered portion 82 can be exhibited by the first tapered portion 81.

Also, in the spectroscopic unit 100, the outer edge 80d of the first aperture 80 is positioned inside the outer edge of the light transmission region 10a of the Fabry-Perot interference filter 10 when viewed from the direction A. According to this, a proportion of light transmitting through the light transmission region 10a of the Fabry-Perot interference filter 10 in the light that has passed through the second aperture 72a and the first aperture 80 can be increased.

Also, in the spectroscopic unit 100, the outer edge of the opening 2a is positioned outside the outer edge of the second aperture 72a when viewed from the direction A. According to this, a range of the incident angle of the light to be incident into the housing 2 can be appropriately defined by the first aperture 80 and the second aperture 72a.

Also, in the spectroscopic unit 100, the first aperture 80 is an opening formed by etching. According to this, the first aperture 80 has a highly accurate shape as compared with a case in which the first aperture 80 is an opening formed by, for example, machining Therefore, according to this, the first aperture 80 can be made to function appropriately.

Also, in the spectroscopic unit 100, the first aperture part 71 is the first aperture member formed separately from the top wall 6 and is provided on the outer surface 6b of the top wall 6. According to this, a degree of freedom in designing the first aperture part 71 such as selection of a suitable material can be improved. Also, a positional relationship between the first aperture 80 and the Fabry-Perot interference filter 10 can be adjusted while the accuracy for positioning the Fabry-Perot interference filter 10 in the housing 2 can be relaxed by forming a large light incident opening in the housing 2. Further, even if the gap G2 is formed between the first aperture part 71 and the second aperture part 72, as described above, the light becoming stray light by being incident into the housing 2 via the gap G2 can be suppressed.

Also, in the spectroscopic unit 100, the first aperture part 71 is fixed to the top wall 6. According to this, deviation in positional relationship between the first aperture 80 and the Fabry-Perot interference filter 10 due to vibration or the like can be prevented from occurring.

Also, in the spectroscopic unit 100, the second aperture part 72 is the second aperture member formed separately from the first aperture part 71. According to this, a degree of freedom in designing the second aperture part 72 and the first aperture part 71 such as selection of a suitable material can be improved. Also, a positional relationship between the second aperture 72a and the Fabry-Perot interference filter 10 can be adjusted while the accuracy for positioning the Fabry-Perot interference filter 10 in the housing 2 can be relaxed by forming a large light incident opening in the housing 2. Also, a positional relationship between the second aperture 72a and the first aperture 80 can be adjusted.

Also, in the spectroscopic unit 100, a cross-sectional shape of the first aperture 80 in the direction perpendicular to the direction A is circular, and a cross-sectional shape of the second aperture 72a in the direction perpendicular to the direction A is circular. According to this, an aperture having a desired performance can be easily formed.

Also, in the spectroscopic unit 100, the region in the first aperture 80 is a space, and the region in the second aperture 72a is a space. According to this, loss of light while passing through the first aperture 80 and the second aperture 72a can be prevented.

Also, the spectroscopic unit 100 includes the photodetector 8 disposed in the housing 2 and detecting light transmitted through the Fabry-Perot interference filter 10. According to this, dispersed light can be detected with high accuracy while suppressing occurrence of noise caused by stray light. Also, since the photodetector 8 is disposed in the housing 2, reduction in size of the spectroscopic unit 100 including the photodetector 8 can be achieved.

Also, the spectroscopic unit 100 includes the bandpass filter 14 disposed between the first aperture 80 and the Fabry-Perot interference filter 10. The first aperture part 71 and the second aperture part 72 are configured so that all the light that has passed through the first aperture 80 and the second aperture 72a is incident on the bandpass filter 14. According to this, all the light that has passed through the second aperture 72a, the first aperture 80, and the opening 2a is incident on the bandpass filter 14 in a state in which a range of the incident angle is made small. Thereby, the bandpass filter 14 functions appropriately, and light in a desired wavelength range is incident on the Fabry-Perot interference filter 10 in a state in which the range of the incident angle is made small. Therefore, a resolution improves in the spectroscopic spectrum obtained by the Fabry-Perot interference filter 10.

Also, in the spectroscopic unit 100, the first aperture part 71 and the second aperture part 72 are configured so that all the light that has passed through the first aperture 80 and the second aperture 72a and transmitted through the bandpass filter 14 is incident on the Fabry-Perot interference filter 10. According to this, generation of stray light in the housing 2 can be suppressed.

Also, in the spectroscopic unit 100, the bandpass filter 14 is separated from the first aperture part 71 via the top wall 6. According to this, since the bandpass filter 14 is disposed in the housing 2, the bandpass filter 14 can be protected from physical interference or the like.

Also, the spectroscopic module 50 includes the spectroscopic unit 100, the light source 51, the housing 2 of the spectroscopic unit 100, and the package 53 accommodating the light source 51. The first aperture 80 and the second aperture 72a are disposed to be adjacent to the light emitting part 51a of the light source 51 along the outer surface of the package 53. According to this, the reflection-type spectroscopic module 50 in which the spectral accuracy by the Fabry-Perot interference filter 10 is improved can be realized.

Also, in the spectroscopic module 50, the light incident opening 72b of the second aperture 72a and the light emitting part 51a of the light source 51 are positioned in the recessed part 62. Thereby, even in a state in which the outer surface 55a of the lid 55 is brought into contact with the object, since a region in the recessed part 62 is secured as an optical path, irradiation of the object with light and detection of light reflected by the object can be performed.

Also, in the spectroscopic module 50, the second aperture 72a is formed on the bottom surface 63a of the first portion 63 of the recessed part 62. Thereby, even in a state in which the outer surface 55a of the lid 55 is brought into contact with the object, light reflected by the object can be reliably incident on the second aperture 72a.

Also, in the spectroscopic module 50, the hole 67 in which the light source 51 is disposed is formed on the bottom surface 64a of the second portion 64 which is deeper than the first portion 63 of the recessed part 62. Thereby, even in a state in which the outer surface of the lid 55 is brought into contact with the object, light emitted from the light source 51 can be sufficiently irradiated to the object.

Also, in the spectroscopic module 50, the concave curved surface 62b is formed between the bottom surface 64a of the second portion 64 and the side surface 62a of the recessed part 62. Thereby, since light reflected by the concave curved surface 62b is also irradiated to the object, the light emitted from the light source 51 can be more sufficiently irradiated to the object.

Also, in the spectroscopic module 50, the hole 67 has a size including the second aperture 72a when viewed from the direction A. Thereby, the light emitted from the light source 51 can be irradiated to the object over a wide range.

Modified Example

The present disclosure is not limited to the above-described embodiment. For example, an example in which the first tapered portion 81 and the second tapered portion 82 are in contact with each other has been illustrated, but the first tapered portion 81 and the second tapered portion 82 may be separated from each other. The first tapered portion 81 and the second tapered portion 82 may reach, for example, an intermediate portion formed between the first tapered portion 81 and the second tapered portion 82 in the direction A. A region in the intermediate portion may have, for example, a columnar shape extending in the direction A. Also, an example in which a rate of change in the diameter of the first tapered portion 81 is the same as a rate of change in the diameter of the second tapered portion 82 has been illustrated, but the rate of change in the diameter of the first tapered portion 81 may be different from the rate of change in the diameter of the second tapered portion 82.

Figure 9:
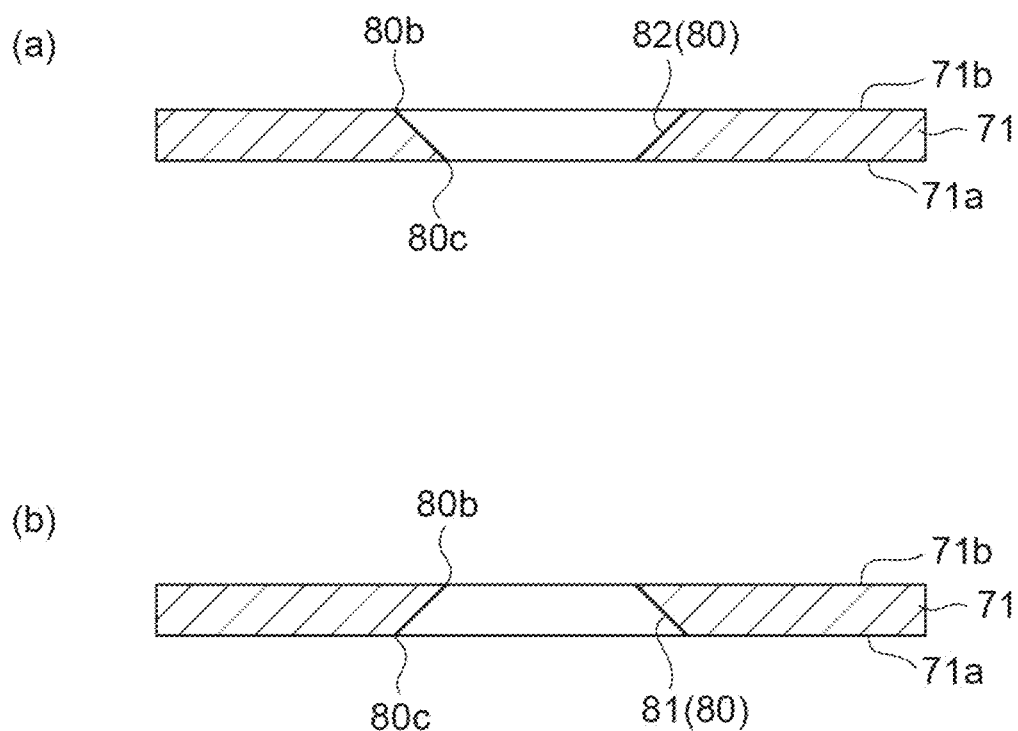
FIG. 9 is a cross-sectional view of a modified example of a first aperture part illustrated in FIG. 8.

Also, as illustrated in (a) of FIG. 9, the first aperture 80 may include only the second tapered portion 82. The second tapered portion 82 may reach both the first surface 71a and the second surface 71b. In this case, an outer edge of the first aperture 80 is the edge of the light emitting opening 80c. According to this, even when the light incident on the second aperture 72a at a large incident angle travels in the second aperture 72a while being reflected by the inner surface of the second aperture 72a, the light is reflected by the inner surface of the second tapered portion 82 toward a side opposite to the inside of the housing 2. Therefore, according to this, the light incident on the second aperture 72a at a large incident angle becoming stray light by being incident into the housing 2 while being reflected by the inner surface of the second aperture 72a can be reliably suppressed. Also, as illustrated in (b) of FIG. 9, the first aperture 80 may include only the first tapered portion 81. The first tapered portion 81 may reach both the first surface 71a and the second surface 71b. In this case, an outer edge of the first aperture 80 is the edge of the light incident opening 80b. As described above, the first aperture 80 may include at least one of the first tapered portion 81 and the second tapered portion 82. When the first aperture 80 includes at least one of the first tapered portion 81 and the second tapered portion 82, at least one of the first tapered portion 81 and the second tapered portion 82 can be easily formed by etching. Also, weight reduction of the first aperture 80 can be achieved.

Also, when the first aperture 80 includes at least one of the first tapered portion 81 and the second tapered portion 82, even when the first aperture part 71 is disposed in an inclined state (a state in which the center line of the first aperture 80 intersects the line L) with respect to the direction A (the line L), a traveling direction of light incident on the first aperture 80 in the direction A can be maintained. Specifically, as illustrated in (a) of FIG. 10, when an aperture 720 formed in an aperture part 710 does not include a tapered portion, that is, when an inner surface of the aperture 720 has, for example, a cylindrical shape, if the aperture part 710 is disposed in a state of being inclined with respect to the direction A, light L3 incident on the aperture 720 in the direction A is reflected by the inner surface of the aperture 720. As a result, the light L3 that has been incident in the direction A travels in the aperture 720 while being reflected by the inner surface of the aperture 720, and then emits from the aperture 720 in a direction intersecting the direction A.

Figure 10:
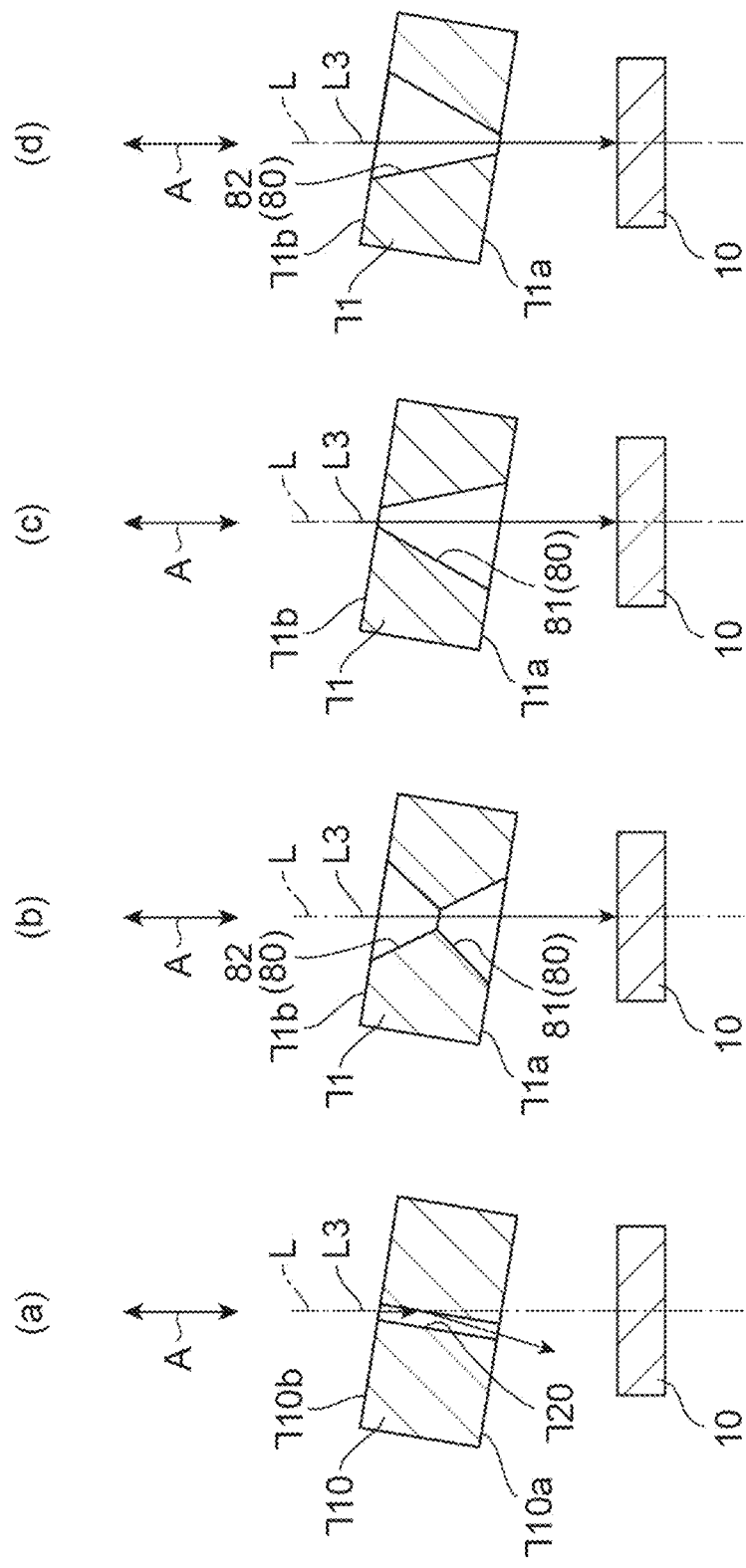
FIG. 10 is a view for explaining an effect of the first aperture part illustrated in FIGS. 8 and 9.

On the other hand, as illustrated in (b) of FIG. 10, when the first aperture 80 includes the first tapered portion 81 and the second tapered portion 82, even if the first aperture part 71 is disposed in a state of being inclined with respect to the direction A, the light L3 incident on the first aperture 80 in the direction A travels in the first aperture 80 in the direction A without being reflected by the inner surface of the first tapered portion 81 or the second tapered portion 82, and then emits from the first aperture 80 in the direction A. Similarly, as illustrated in (c) of FIG. 10, when the first aperture 80 includes only the first tapered portion 81, even if the first aperture part 71 is disposed in a state of being inclined with respect to the direction A, the light L3 incident on the first aperture 80 in the direction A travels in the first aperture 80 in the direction A without being reflected by the inner surface of the first tapered portion 81, and then emits from the first aperture 80 in the direction A. Similarly, as illustrated in (d) of FIG. 10, when the first aperture 80 includes only the second tapered portion 82, even if the first aperture part 71 is disposed in a state of being inclined with respect to the direction A, the light L3 incident on the first aperture 80 in the direction A travels in the first aperture 80 in the direction A without being reflected by the inner surface of the second tapered portion 82, and then emits from the first aperture 80 in the direction A. According to this, the light L3 incident on the first aperture 80 in the direction A is emitted in the direction A while the accuracy for positioning the first aperture part 71 can be relaxed, and thereby the bandpass filter 14 or the Fabry-Perot interference filter 10 can be made to function appropriately.

Such a point is especially important when a width (for example, diameter) of an outer edge of the aperture is small. That is, when a width of the outer edge of the aperture is small, an amount of light passing through the aperture (here, light traveling in the direction A) tends to be small. Therefore, in order to secure an amount of light passing through the aperture, it is important not to reduce the amount of light traveling in the direction A. Also, as the width of the outer edge of the aperture becomes smaller, when the aperture part is slightly inclined with respect to the direction A (for example, see (a) of FIG. 10), the light incident on the aperture in the direction A becomes to be easily reflected by the inner surface of the aperture. According to the first aperture part 71, as described above, even if the first aperture part 71 is disposed in a state of being inclined with respect to the direction A, a traveling direction of the light incident on the first aperture 80 in the direction A can be maintained. Therefore, decrease in the amount of light passing through the aperture in the direction A can be suppressed. Further, for convenience of illustration, dimensional ratios and the like are different between the first aperture part 71 and the Fabry-Perot interference filter 10 illustrated in (a) to (d) of FIG. 10 and the first aperture part 71 and the Fabry-Perot interference filter 10 illustrated in other drawings.

Also, when viewed from the direction A, the outer edge of the second aperture 72a may be positioned outside the outer edge of the light transmission region 10a of the Fabry-Perot interference filter 10 or the outer edge of the opening 2a. In that case, a sufficient amount of light entering inside the housing 2 can be secured.

Also, the first aperture part 71 may be integrally formed with the housing 2. In this case, a part of the top wall 6 of the cap 4 functions as the first aperture part 71, and the first aperture 80 is formed in the top wall 6 to communicate with the opening 2a. When the first aperture part 71 is integrally formed with the housing 2, deviation in positional relationship between the first aperture 80 and the Fabry-Perot interference filter 10 due to vibration or the like can be prevented from occurring with a simple configuration.

Also, an example in which the first aperture part 71 is in contact with the top wall 6 has been illustrated, but the first aperture part 71 may be separated from the top wall 6. Also, the first aperture part 71 may be in contact with the second aperture part 72. Also, the first aperture part 71 may be integrally formed with the second aperture part 72. In this case, a part of the lid 55 functions as the first aperture part 71, and the first aperture 80 is formed on the lid 55 to communicate with the second aperture 72a. When the first aperture part 71 is integrally formed with the second aperture part 72, deviation in positional relationship between the first aperture 80 and the second aperture 72a due to vibration or the like can be prevented from occurring with a simple configuration.

Also, the second aperture part 72 may be the second aperture member formed separately from the lid 55. In this case, a degree of freedom in designing the second aperture part 72 such as selection of a suitable material can be improved. Also, a positional relationship between the second aperture 72a and the first aperture 80 or the Fabry-Perot interference filter 10 can be more easily adjusted.

Also, the reflection-type spectroscopic module 50 described above can perform irradiation of the object with light and detection of light reflected by the object even in a state in which the outer surface of the lid 55 is separated from the object without bringing the outer surface 55a of the lid 55 into contact with the object. Also, the spectroscopic unit 100 may also be applied to a transmission-type spectroscopic module 50 that detects light emitted from the light source 51 and transmitted through the object. Also, the spectroscopic unit 100 may not include the photodetector 8, and light transmitted through the Fabry-Perot interference filter 10 may be detected by the photodetector 8 disposed outside the housing 2.

REFERENCE SIGNS LIST

1 Photodetection device
2 Housing
2a Opening
6 Top wall (wall part)
8 Photodetector
10 Fabry-Perot interference filter
10a Light transmission region
35 First mirror part
36 Second mirror part
50 Spectroscopic module
51 Light source
51a Light emitting part
53 Package
55a Outer surface
71 First aperture part
71a First surface
71b Second surface
72 Second aperture part
72a Second aperture
80 First aperture
80d Outer edge
81 First tapered portion
82 Second tapered portion
100 Spectroscopic unit
A Direction (facing direction)
T1, T2 Length

The invention claimed is:

1. A spectroscopic unit comprising:
a Fabry-Perot interference filter including a first mirror part and a second mirror part in which a distance therebetween is variable;
a housing including a wall part that extends along a direction intersecting a facing direction of the first mirror part and the second mirror part, the wall part formed with an opening facing the Fabry-Perot interference filter in the facing direction of the first mirror part and the second mirror part, wherein the opening is a through hole penetrating the wall part and the opening is a light passage, the housing accommodating the Fabry-Perot interference filter;
a first aperture part provided on a side opposite to the Fabry-Perot interference filter with respect to the wall part and formed with a first aperture facing the opening in the facing direction; and
a second aperture part provided on a side opposite to the wall part with respect to the first aperture part and formed with a second aperture facing the first aperture in the facing direction, wherein
a length of the second aperture in the facing direction is larger than a length of the first aperture in the facing direction,
an outer edge of the first aperture is positioned inside each of an outer edge of the opening and an outer edge of the second aperture when viewed from the facing direction, and
the first aperture includes at least one of a first tapered portion reaching a first surface of the first aperture part on the wall part side and extending toward the first surface, and a second tapered portion reaching a second surface of the first aperture part on the second aperture part side and extending toward the second surface.

2. The spectroscopic unit according to claim 1, wherein the first aperture includes both the first tapered portion and the second tapered portion.

3. The spectroscopic unit according to claim 1, wherein the first aperture includes only the second tapered portion, and
the second tapered portion reaches both the first surface and the second surface.

4. The spectroscopic unit according to claim 1, wherein the outer edge of the first aperture is positioned inside an outer edge of a light transmission region of the Fabry-Perot interference filter when viewed from the facing direction.

5. The spectroscopic unit according to claim 1, wherein the outer edge of the opening is positioned outside the outer edge of the second aperture when viewed from the facing direction.

6. The spectroscopic unit according claim 1, wherein the first aperture is an opening formed by etching.

7. The spectroscopic unit according to claim 1, wherein the first aperture part is a first aperture member formed separately from the wall part and is provided on a surface of the wall part.

8. The spectroscopic unit according to claim 7, wherein the first aperture part is fixed to the wall part.

9. The spectroscopic unit according to claim 1, wherein the second aperture part is a second aperture member formed separately from the first aperture part.

10. The spectroscopic unit according to claim 1, wherein a cross-sectional shape of the first aperture in a direction perpendicular to the facing direction is circular, and a cross-sectional shape of the second aperture in the direction perpendicular to the facing direction is circular.

11. The spectroscopic unit according to claim 1, wherein a region in the first aperture is a space, and
a region in the second aperture is a space.

12. The spectroscopic unit according to claim 1, further comprising a photodetector disposed in the housing and configured to detect light transmitted through the Fabry-Perot interference filter.

13. The spectroscopic unit according to claim 1, further comprising:
a bandpass filter disposed between the first aperture and the Fabry-Perot interference filter, wherein
the first aperture part and the second aperture part are configured so that all light which has passed through the first aperture and the second aperture is incident on the bandpass filter.

14. The spectroscopic unit according to claim 13, wherein the first aperture part and the second aperture part are configured so that all the light which has passed through the first aperture and the second aperture and transmitted through the bandpass filter is incident on the Fabry-Perot interference filter.

15. The spectroscopic unit according to claim 13, wherein the bandpass filter is separated from the first aperture part via the wall part.

16. A spectroscopic module comprising:
the spectroscopic unit according to claim 1;
a light source; and
a package accommodating the housing of the spectroscopic unit and the light source, wherein
the first aperture and the second aperture are disposed to be adjacent to a light emitting part of the light source along an outer surface of the package.

17. A spectroscopic unit comprising:
a Fabry-Perot interference filter including a first mirror part and a second mirror part in which a distance therebetween is variable;
a housing including a wall part that extends along a direction intersecting a facing direction of the first mirror part and the second mirror part, the wall part formed with an opening facing the Fabry-Perot interference filter in the facing direction of the first mirror part and the second mirror part, wherein the opening is a through hole penetrating the wall part and the opening is a light passage, the housing accommodating the Fabry-Perot interference filter;
a first aperture part formed with a first aperture facing the opening in the facing direction; and
a second aperture part provided on a side opposite to the wall part with respect to the first aperture part and formed with a second aperture facing the first aperture in the facing direction, wherein
a length of the second aperture in the facing direction is larger than a length of the first aperture in the facing direction,
an outer edge of the first aperture is positioned inside each of an outer edge of the opening and an outer edge of the second aperture when viewed from the facing direction, and
the first aperture includes at least one of a first tapered portion reaching a first surface of the first aperture part on the wall part side and extending toward the first surface, and a second tapered portion reaching a second surface of the first aperture part on the second aperture part side and extending toward the second surface.

\* \* \* \* \*